S. J. Genung

Extension Table.

No. 3,771. Reissued Dec. 21, 1869.

Witnesses.

F. A. Davis.

Geo. W. Matt.

Inventor.

S. J. Genung

By J. Fraser & Co.

Attys.

N. PETERS, PHOTO-LITHOGRAPHER, WASHINGTON, D. C.

United States Patent Office.

S. J. GENUNG, OF WATERLOO, NEW YORK.

*Letters Patent No.* 94,486, *dated September* 7, 1869; *reissue No.* 3,771, *dated December* 21, 1869.

IMPROVED EXTENSION-SLIDE FOR TABLES.

The Schedule referred to in these Letters Patent and making part of the same.

*To all whom it may concern:*

Be it known that I, S. J. GENUNG, of Waterloo, in the county of Seneca, and State of New York, have invented a certain new and useful Improvement in Extension-Table Slides; and I do hereby declare that the following is a full and exact description thereof, reference being had to the accompanying drawings, in which—

Figure 1:
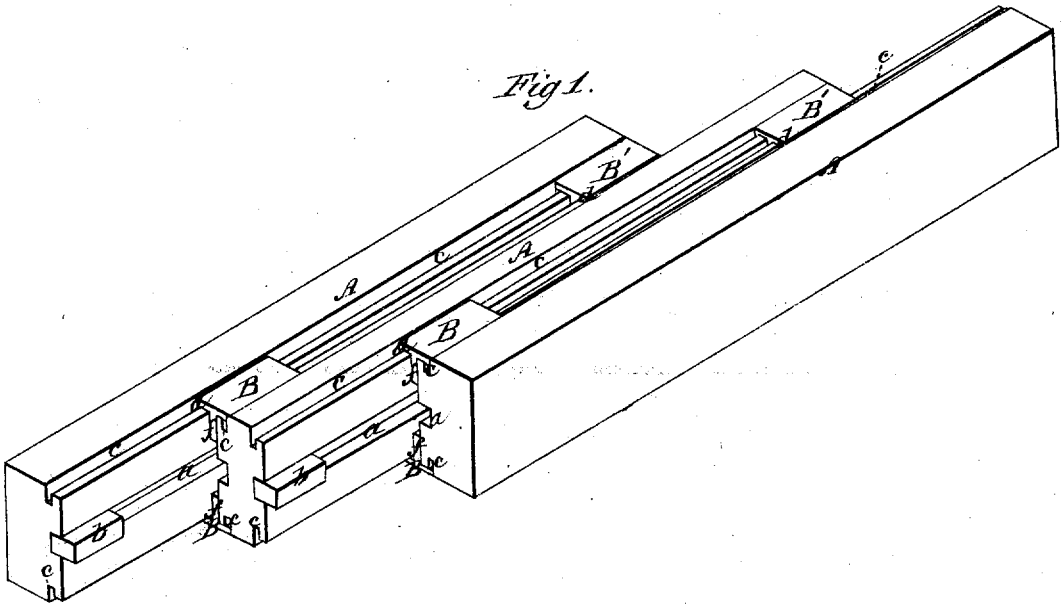

Figure 1 is a perspective view of a set of extension-bars with my improvement.

Figure 2:
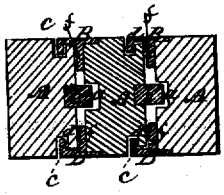

Figure 2, a cross-section of the same.

Figure 3:
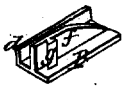

Figure 3, a perspective view of one of the slides.

Like letters of reference indicate corresponding parts in all the figures.

My invention consists in combining, with the wooden bars of an extension-table, separators at the ends thereof, which will take the friction without any central bearing or connection of the several bars; also, in the employment of dovetail-lugs upon the slides, for securing the latter to the wood; and, further, in the combination, with the slides, constructed as hereinafter described, and holding on top and bottom of the bars, of a central tongue-arrangement, for completing the construction.

In the drawing—

A A A A are the ordinary extension-bars, arranged in the usual manner, except that a central groove, *a*, is cut longitudinally in the face of each, in which slides a central tongue of the next.

These tongues serve as stops, when they strike together at the extent of movement of the bars.

In the upper and lower edges of the bars, are also cut grooves, *c c*, on which slide the ordinary right-angled bearing, *d d*, of the slides B B.

These slides, preferably, have central vertical tongues, *f f*, which project down in the space between the bars, and serve to keep them separated, so that they will not come in contact in expanding or closing.

These tongues, by preventing the contact of the wood, obviate a great difficulty which is experienced in common extension-bars, arising from the swelling of the wood in damp weather, and the warping of the bars under a dry temperature. In such cases, the close contact of the wood renders the bars inoperative.

In my invention, all difficulty of the kind is obviated, for the separation of the wood is sufficient to compensate for all expansion and contraction.

A simple fastening of the slides B to the wood is made, by casting thereon a vertically-projecting dovetailed lug, *g*, which is mortised into the wood, thereby holding in place without screws.

In connection with these slides B B′, holding upon the opposite outside edges of the bars, the central blocks or tongues *b*, holding in the grooves *a*, are of importance, as thereby the connection is greatly strengthened, and undue strain is prevented from reaching the outside connections.

The central connection holds the vertical strain, while the outside ones hold the horizontal or lateral strain.

By the use of the slides, as above described, it will be noticed that no extra and expensive machinery is required for cutting and fitting the grooves of the bars to receive them, as is the case in the use of many other kinds of slides.

A simple circular saw will cut all the grooves in my bars, since the work is all plain. In others, it is necessary to have special machinery for the purpose.

I am aware that the wooden bars of extension-tables have before been separated from contact by metallic plates, running the entire length of said bars, and interlocking to produce the connection, as in the patent of William Heerdt, June 8, 1858; but, in such case, there is a frictional contact of the interlocking surfaces the entire length of said bars. Such an arrangement I do not claim, but limit myself to the use of separators at the ends of the bars, which form the frictional surfaces, without any contact of the centre of the bars.

What I claim as my invention, and desire to secure by Letters Patent, is—

1. The combination, with the wooden bars of an extension-table, of separators at the ends, which receive the frictional contact at those points, without any intermediate connection of the bars, as herein described.

2. Forming the slides B with the dovetailed lugs *g*, for attaching to the wood, in the manner and for the purpose specified.

3. In combination with the outside slides B B′, the central connection *a b*, substantially as described.

S. J. GENUNG.

Witnesses:

R. F. OSGOOD,

GEO. W. MIATT.